US008394281B2

(12) United States Patent
Sim et al.

(10) Patent No.: US 8,394,281 B2
(45) Date of Patent: Mar. 12, 2013

(54) METHOD OF MANUFACTURING NOZZLE PLATE AND INKJET HEAD

(75) Inventors: Won-Chul Sim, Seongnam-si (KR); Jae-Woo Joung, Suwon-si (KR); Young-Jae Kim, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 312 days.

(21) Appl. No.: 12/926,053

(22) Filed: Oct. 22, 2010

(65) Prior Publication Data

US 2011/0041336 A1 Feb. 24, 2011

Related U.S. Application Data

(62) Division of application No. 12/010,438, filed on Jan. 24, 2008, now Pat. No. 7,841,698.

(30) Foreign Application Priority Data

Sep. 27, 2007 (KR) ........................ 10-2007-0097141

(51) Int. Cl.
*G01D 15/00* (2006.01)

(52) U.S. Cl. ........................................................ 216/27

(58) Field of Classification Search .................... 216/27; 347/43, 47

See application file for complete search history.

(56) References Cited

U.S. PATENT DOCUMENTS

| | | | | |
|---|---|---|---|---|
| 7,104,632 | B2 | 9/2006 | Song et al. | |
| 7,175,257 | B2 | 2/2007 | Park et al. | |
| 7,926,177 | B2 * | 4/2011 | Kang et al. | 29/890.1 |
| 7,954,926 | B2 * | 6/2011 | Bertelsen et al. | 347/47 |

OTHER PUBLICATIONS

U.S. Appl. No. 12/010,438, filed Jan. 24, 2008, Won-Chul Sim et al., Samsung Electro-Mechanics Co., Ltd.

U.S. Patent Office Action, mailed May 26, 2010, issued in corresponding U.S. Appl. No. 12/010,438.

U.S. Patent Notice of Allowance mailed Jul. 22, 2010 issued in corresponding U.S. Appl. No. 12/010,438.

* cited by examiner

*Primary Examiner* — Lamson Nguyen

(57) ABSTRACT

A method of manufacturing an inkjet head includes: forming an inlet and a pressure chamber in an upper substrate, the inlet penetrating the upper substrate and providing a passage for an inflow of ink, and the pressure chamber formed as a recess in one side of the upper substrate; forming a manifold and an ink channel in a middle substrate, the manifold configured to be connected with the inlet, and the ink channel penetrating the middle substrate and configured to be connected with the pressure chamber; forming a straight portion and a nozzle in a plate substrate, the straight portion configured to be connected with the ink channel, and the nozzle connected with the straight portion; forming a hydrophobic layer on one side of the plate substrate, the hydrophobic layer having a window formed therein, and the window opening the nozzle by a circumference greater than a circumference of an end of the nozzle; and stacking in order and attaching the upper substrate, the middle substrate, and the plate substrate.

14 Claims, 22 Drawing Sheets

METHOD OF MANUFACTURING NOZZLE PLATE AND INKJET HEAD

CROSS-REFERENCE TO RELATED APPLICATIONS

This application is a U.S. divisional application filed under 37 USC 1.53(b) claiming priority benefit of U.S. Ser. No. 12/010,438 filed in the United States on Jan. 24, 2008 now U.S. Pat. No. 7,841,698, which claims earlier priority benefit to Korean Patent Application No. 10-2007-0097141 filed with the Korean Intellectual Property Office on Sep. 27, 2007, the disclosures of which are incorporated herein by reference.

BACKGROUND

1. Field

The present invention relates to a nozzle plate, an inkjet head, and a manufacturing method of the same.

2. Description of the Related Art

Inkjet printing technology has been used mainly in the field of OA (office automation), as well as in industrial fields such as for package marking and printing on clothing. However, with developments in functional ink which includes metal nanoparticles of silver and nickel, etc., the potential applicability of inkjet printing technology has gradually expanded. Current applications of inkjet printing thus include forming circuit patterns in printed circuit boards using functional ink that contains metal nanoparticles.

Continuous developments are currently being made in techniques involving inkjet printing, and in the electronics industry, methods are being studied of utilizing inkjet printing in the manufacture of color filters in liquid crystal displays, and printed circuit boards (PCB's), etc. In contrast to the inkjet technology in the office environment, inkjet methods for industrial use require the operation of all of the multitude of nozzles, formed in the inkjet head in numbers of 128 or 256, etc.

The structure of a typical inkjet head includes a pressure chamber which carries the ink and pressurizes the ink according to changes in its volume, a nozzle connected to a portion of the pressure chamber, a manifold connected to another portion of the pressure chamber which stores the ink supplied to the pressure chamber, and an ink inlet through which ink is supplied to the manifold.

The ink supplied through the ink inlet passes through the manifold and into the pressure chamber, and the ink pressurized in the pressure chamber is ejected out through the nozzle. A piezoelectric component, such as an actuator, etc., is coupled to the pressure chamber to change the volume of the pressure chamber, whereby the ink carried in the pressure chamber can be pressurized.

FIG. 1 is a cross-sectional view of a nozzle plate according to the related art, FIG. 2 is a cross-sectional view of another nozzle plate according to the related art, and FIG. 3 is a diagram illustrating the meniscus of ink ejected from a nozzle plate according to the related art.

The ink from an inkjet head has to be ejected in a stable manner in the form of a complete droplet, in order to obtain a high printing quality. For this, a hydrophobicity treatment may be performed around the exit of the nozzle 102, so that the meniscus 106 of the ink droplet may be formed appropriately.

Without a hydrophobicity treatment, wetting may occur, in which the ink douses the surface of the nozzle 102 exit as it is ejected from the nozzle 102, so that the ink dousing the surface of the nozzle 102 and the ink being ejected form a lump together, causing the ink to be ejected in a flowing manner without achieving a complete droplet. This may result in poor printing quality, and the meniscus 106 formed subsequently after the ejection of ink may also become unstable. Therefore, in order to ensure a level of reliability in an inkjet head, there is a need to perform a hydrophobicity treatment on the surface of the nozzles 102.

Thus, in the past, a hydrophobic layer 104 was formed around the exit of the nozzle 102, as illustrated in FIG. 1, or the hydrophobic layer 104 was formed on the inner surface of the exit of the nozzle 102, as well as around the nozzle 102.

However, when operating an inkjet head, not all of the nozzles 102 in the head are used in ejecting the ink at a particular instance. There may be some nozzles 102 that eject ink, in order to form an image, while there may be some that do not.

For a nozzle 102 through which ink is not ejected, the meniscus 106 may be positioned in the back inside the nozzle 102, as the ink solvent remaining on the nozzle 102 exit vaporizes. When the actuator is operated again to eject ink, this can cause problems in ink ejection, and in sever cases, can cause the ink not to be ejected at all. In particular, if a volatile solvent is used for the ink solvent, the volatile solvent will vaporize faster, so that ink residue may remain inside the nozzle and cause severe problems in ink ejection.

Also, in the case of functional ink containing nanoparticles, as the ink solvent vaporizes, the particles may clog near the nozzle exit, where the particles are in contact with air, so that the nozzle may be blocked.

Furthermore, in the maintenance of an inkjet head, wipers may be used to clean the nozzle portion, and the frequent contact with the wipers can become a cause of abrasion on the nozzles, which may lead to poor printing quality.

SUMMARY

An aspect of the invention is to provide a nozzle plate, an inkjet head, and a manufacturing method thereof, which enable the meniscus of ink to be formed to a greater size around the nozzle exit, thereby preventing degradations in ink ejection performance due to the vaporization of the solvent, and preventing blockage in the nozzles due to the clogging of particles.

Another aspect of the invention is to provide a nozzle plate, an inkjet head, and a manufacturing method thereof, in which a hydrophobic layer is formed around the nozzle exit, thereby preventing damage to the nozzle ends from wipers during the maintenance of the inkjet head, and thus enhancing the straightness of ink ejection.

One aspect of the invention provides a method of manufacturing a nozzle plate which includes: forming a nozzle by selectively etching one side of a plate substrate, forming a straight portion connecting with the nozzle by selectively etching the other side of the plate substrate, and forming a hydrophobic layer on the one side of the plate substrate, where a window is formed in the hydrophobic layer that opens the nozzle by a circumference greater than a circumference of an end of the nozzle.

Before forming the hydrophobic layer, an operation may further be included of forming a hydrophilic layer on at least one surface of the plate substrate.

If the plate substrate is a silicon substrate, the hydrophilic layer may be formed by growing an oxide film (SiO2).

In cases where the plate substrate is made of a silicon substrate, forming the nozzle can include: coating a first photoresist on one side of the silicon substrate, selectively removing the first photoresist in correspondence with a position where the nozzle is to be formed, etching the silicon substrate in correspondence with a position where the nozzle is to be formed, and removing the first photoresist remaining on the silicon substrate, while forming the straight portion can include: coating a second photoresist on the other side of the silicon substrate, selectively removing the second photoresist in correspondence with a position where the straight portion is to be formed, etching the silicon substrate in correspondence with a position where the straight portion is to be formed, and removing the second photoresist remaining on the silicon substrate.

The operation of forming the hydrophobic layer may include: forming a plating layer by plating a hydrophobic material on one side of the plate substrate, stacking a mask on the one side of the plate substrate that has an aperture formed in correspondence with a position where the window is to be formed, applying plasma treatment on the plating layer in correspondence with a position where the window is to be formed, and removing the mask. In this case, the hydrophobic material can be polytetrafluroethylene (PTFE).

Another aspect of the invention provides a method of manufacturing an inkjet head which includes: forming in an upper substrate an inlet, which penetrates the upper substrate and provides a passage for an inflow of ink, and a pressure chamber, which is formed as a recess in one side of the upper substrate; forming in a middle substrate a manifold, which is to be connected with the inlet, and an ink channel, which penetrates the middle substrate and which is to be connected with the pressure chamber; forming in a plate substrate a straight portion, which is to be connected with the ink channel, and a nozzle, which is connected with the straight portion; forming on one side of the plate substrate a hydrophobic layer, in which a window is formed that opens the nozzle by a circumference greater than a circumference of an end of the nozzle; and stacking the upper substrate, the middle substrate, and the plate substrate in order and attaching them together.

The method may further include an operation of attaching a piezoelectric component on an upper portion of the pressure chamber of the upper substrate, after attaching the upper substrate, the middle substrate, and the plate substrate together.

The upper substrate, the middle substrate, and the plate substrate can be formed by processing silicon substrates, and the attaching can be performed by silicon direct bonding.

Before forming the hydrophobic layer, an operation of forming a hydrophilic layer on at least one surface of the plate substrate may be additionally be included. If the plate substrate is a silicon substrate, the hydrophilic layer may be formed by growing an oxide film (SiO2).

The plate substrate can be made of a silicon substrate, while forming the nozzle can include: coating a first photoresist on one side of the silicon substrate, selectively removing the first photoresist in correspondence with a position where the nozzle is to be formed, etching the silicon substrate in correspondence with a position where the nozzle is to be formed, and removing the first photoresist remaining on the silicon substrate, and forming the straight portion can include: coating a second photoresist on the other side of the silicon substrate, selectively removing the second photoresist in correspondence with a position where the straight portion is to be formed, etching the silicon substrate in correspondence with a position where the straight portion is to be formed, and removing the second photoresist remaining on the silicon substrate.

The operation of forming the hydrophobic layer may include: forming a plating layer by plating a hydrophobic material on one side of the plate substrate, stacking a mask on the one side of the plate substrate that has an aperture formed in correspondence with a position where the window is to be formed, applying plasma treatment on the plating layer in correspondence with a position where the window is to be formed, and removing the mask. In this case, the hydrophobic material can be polytetrafluroethylene (PTFE).

Still another aspect of the invention provides a nozzle plate that ejects droplets of ink, and which includes: a plate substrate, a nozzle formed as a recess in one side of the plate substrate, a straight portion formed as a recess in the other side of the plate substrate and connected with the nozzle, and a hydrophobic layer which is formed on the one side of the plate substrate and in which a window is formed that opens the nozzle by a circumference greater than a circumference of an end of the nozzle.

In certain embodiments, the nozzle plate can further include a hydrophilic layer formed on an inner perimeter of the nozzle, an inner perimeter of the straight portion, and a bottom side of the window. In this case, the hydrophobic layer can be formed to a thickness greater than that of the hydrophilic layer.

The plate substrate may be a silicon substrate, and the hydrophilic layer may be formed by growing an oxide film.

The ink ejected from the nozzle plate may be a volatile ink.

The plate substrate may be a silicon substrate, made of a silicon (Si) material.

Yet another aspect of the invention provides an inkjet head, which is configured to eject droplets of ink and which is formed by stacking in order and attaching an upper substrate, a middle substrate, and a plate substrate. The inkjet head includes: an inlet which penetrates the upper substrate and provides a passage for an inflow of ink; a pressure chamber formed as a recess in a side of the upper substrate facing the middle substrate; a manifold, which penetrates the middle substrate, and which is connected with the inlet; an ink channel, which penetrates the middle substrate, and which is connected with the pressure chamber; a straight portion, which is formed as a recess in one side of the plate substrate facing the middle substrate and is connected with the ink channel; a nozzle, which penetrates the plate substrate from a bottom side of the straight portion to the other side of the plate substrate; and a hydrophobic layer, which is formed on the other side of the plate substrate, and in which a window is formed that opens the nozzle by a circumference greater than a circumference of the nozzle.

The inkjet head according to certain embodiments of the invention can further include a hydrophilic layer formed on an inner perimeter of the nozzle, an inner perimeter of the straight portion, and a bottom side of the window. In this case, the hydrophobic layer may be formed to a thickness greater than a thickness of the hydrophilic layer. Also, a piezoelectric component coupled to one side of the pressure chamber and configured to change a volume of the pressure chamber can further be included.

The plate substrate may be a silicon substrate, and the hydrophilic layer may be formed by growing an oxide film.

The ink ejected from the nozzle plate may be a volatile ink.

The upper substrate, the middle substrate, and the plate substrate can be formed by processing silicon substrates, and can be attached by silicon direct bonding.

Additional aspects and advantages of the present invention will be set forth in part in the description which follows, and in part will be obvious from the description, or may be learned by practice of the invention.

DESCRIPTION OF EMBODIMENTS

Figure 1:
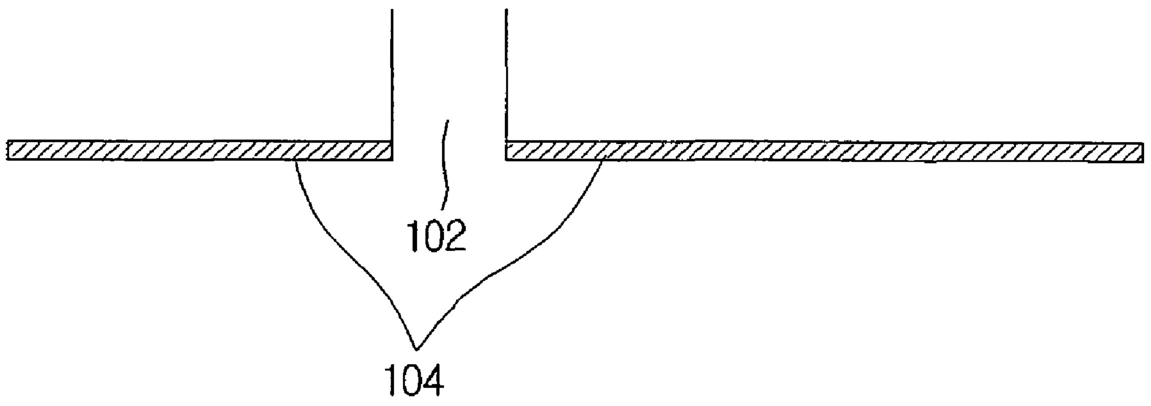
FIG. 1 PRIOR ART
FIG. 1 is a cross-sectional view of a nozzle plate according to the related art.
Figure 2:
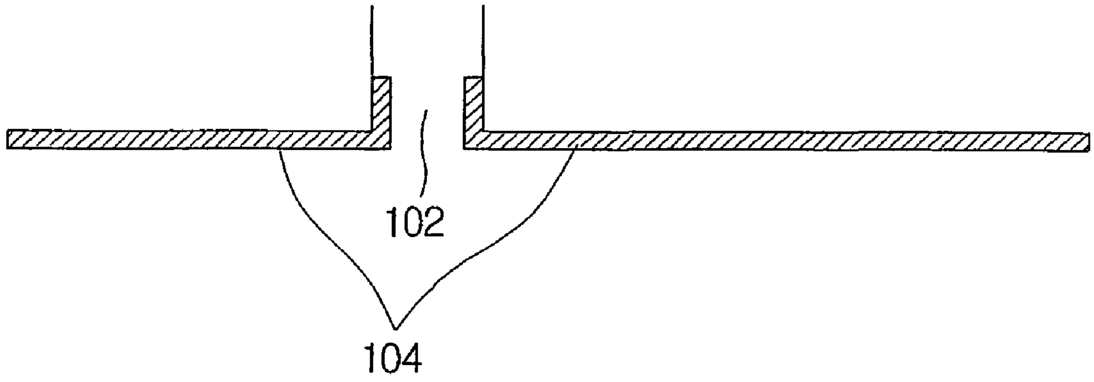
FIG. 2 PRIOR ART
FIG. 2 is a cross-sectional view of another nozzle plate according to the related art.
Figure 3:
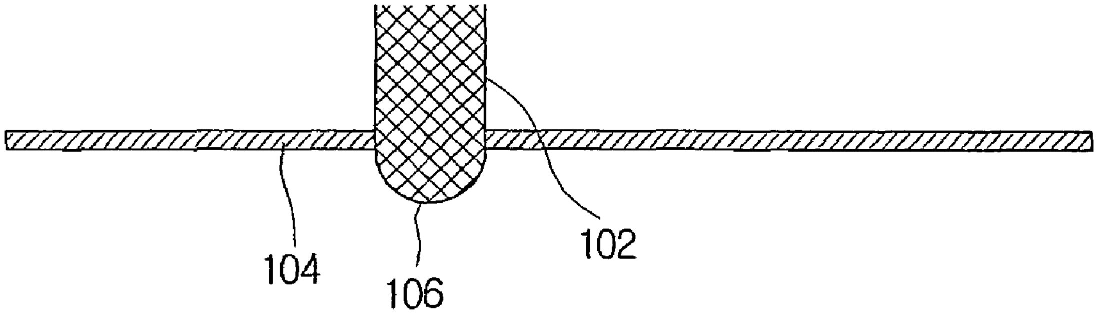
FIG. 3 PRIOR ART
FIG. 3 is a diagram illustrating the meniscus of ink ejected from a nozzle plate according to the related art.

As the invention allows for various changes and numerous embodiments, particular embodiments will be illustrated in drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

While such terms as "first," "second," etc., may be used to describe various elements, such elements must not be limited to the above terms. The above terms are used only to distinguish one element from another.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

The nozzle plate, inkjet head, and manufacturing method thereof according to certain aspects of the invention will be described below in more detail with reference to the accompanying drawings, in which those elements are rendered the same reference numeral that are the same or are in correspondence, regardless of the figure number, and redundant explanations are omitted.

Figure 4:
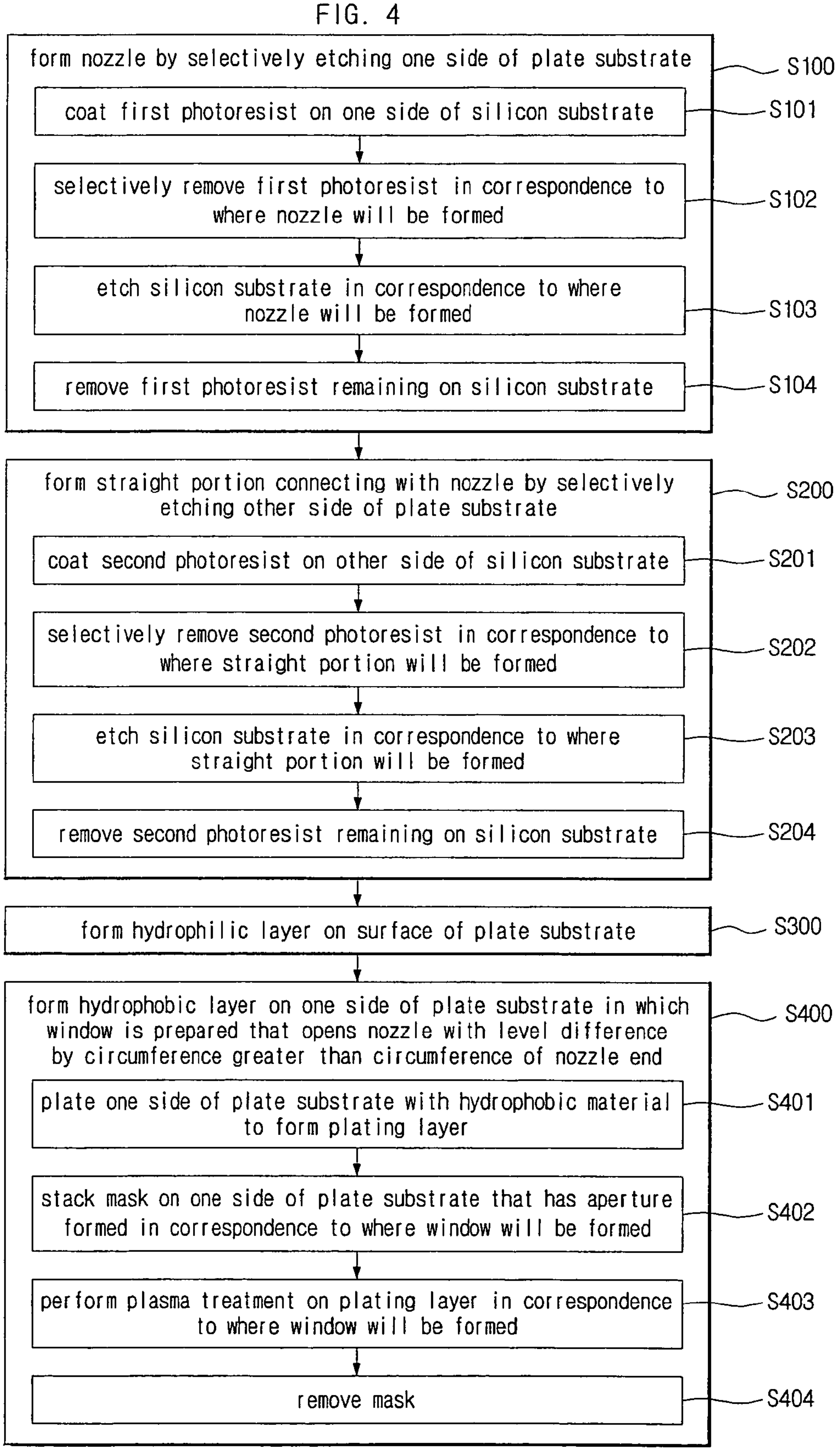
FIG. 4 is a flowchart of a method of manufacturing a nozzle plate according to a first disclosed embodiment of the present invention.

FIG. 4 is a flowchart of a method of manufacturing a nozzle plate according to a first disclosed embodiment of the present invention, and FIG. 5 to FIG. 14 are cross-sectional views representing a flow diagram for a method of manufacturing a nozzle plate according to the first disclosed embodiment of the present invention. In FIGS. 5 to 14 are illustrated a plate substrate 12, photoresists 14*a*, 14*b*, a nozzle 16, a straight portion 18, a hydrophilic layer 20, a plating layer 21, a hydrophobic layer 22, a mask 24, upper substrate 26, middle substrate 25, pressure chamber 28, inlet 30, manifold 32, ink channel 34, and a window 36.

This embodiment relates to a method of manufacturing a nozzle plate, which can include forming a nozzle 16 by selectively etching one side of a plate substrate 12, forming a straight portion 18 that is connected with the nozzle 16 by selectively etching the other side of the plate substrate 12, and forming a hydrophobic layer 22, in which a window is prepared that opens the nozzle 16 by a circumference greater than the circumference of the end of the nozzle 16, on one side of the plate substrate 12. Here, the meniscus of ink can be formed to a greater size around the nozzle 16 exit, which can prevent degradations in ink ejection performance caused by the vaporization of the ink solvent, as well as blockage of the nozzle 16 caused by the clogging of ink particles.

Looking at a method of manufacturing a nozzle plate according to this embodiment, first, one side of a plate substrate 12 may be selectively etched to form a nozzle 16 (S100).

This particular embodiment presents a method of manufacturing a nozzle plate that uses a silicon substrate, made of a silicon (Si) material, as the plate substrate 12. Of course, any of a variety of forms of plate substrate 12 apparent to those skilled in the art other than the silicon substrate, such as a substrate made of a metal material, can be used for the plate substrate 12.

Figure 5:
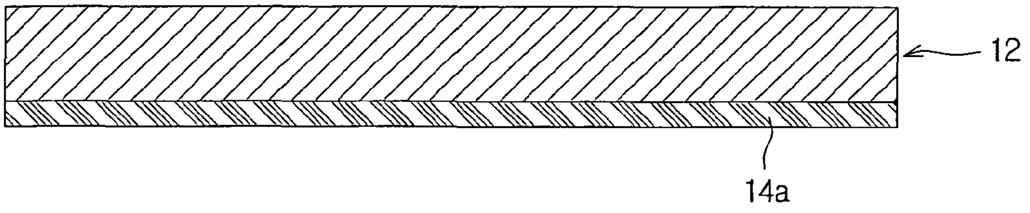
FIG. 5, FIG. 6, FIG. 7, FIG. 8, FIG. 9, FIG. 10, FIG. 11, FIG. 12, FIG. 13, and FIG. 14 are cross-sectional views representing a flow diagram for a method of manufacturing a nozzle plate according to the first disclosed embodiment of the present invention.

One method of forming the nozzle 16 in one side of the plate substrate 12 may include, as illustrated in FIG. 5, coating a photoresist 14*a* on one side of a silicon substrate (S101). The photoresist 14*a* may be a photosensitive material, and may be coated on one side of the plate substrate 12 in the form of a film or in the form of a liquid.

Figure 6:
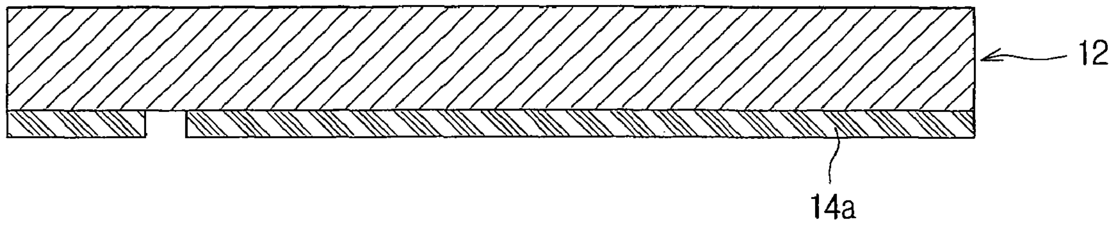

Next, as illustrated in FIG. 6, the photoresist 14*a* may be selectively removed in correspondence to a position where the nozzle 16 is to be formed (S102). As the silicon substrate will be etched to form the nozzle 16, the photoresist 14*a* can be exposed and developed such that an aperture exists at the position where the nozzle 16 is to be formed, after which the photoresist 14*a* can be selectively removed in correspondence to the position where the nozzle 16 will be formed.

Figure 7:
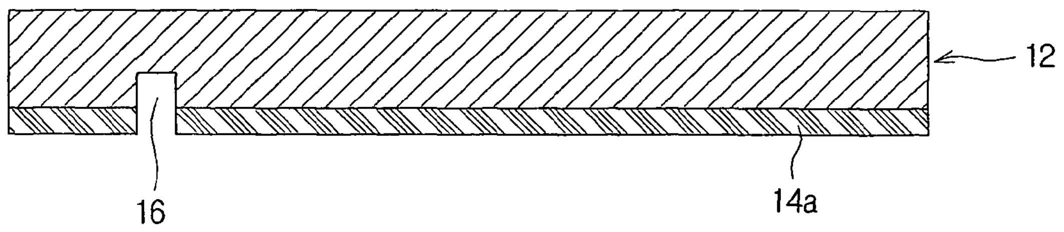

Next, as illustrated in FIG. 7, the silicon substrate may be etched in correspondence to the position where the nozzle 16 will be formed (S103). For this procedure, wet etching may be employed, in which an etching liquid capable of etching the silicon liquid is applied, or dry etching may be employed, in which the substrate is etched in one direction to a particular depth. In this embodiment, as the nozzle 16 is formed in a straight shape, a straight etching process is employed to form the nozzle 16. However, the shape of the nozzle 16 is not thus limited, and it is possible to fashion the nozzle 16 in other shapes, such as a funnel shape having a cone portion and an exit outlet. An example of a typical straight etching process is ICP-RIE (inductively coupled plasma reactive ion etching), but the invention is not thus limited.

While in this embodiment, only a portion of the silicon substrate is etched, because a straight portion 18 will be formed in a subsequent process to which the nozzle 16 will be connected, it is possible to form the nozzle 16 such that the nozzle 16 penetrates the silicon substrate.

Next, the photoresist 14*a* remaining on the silicon substrate may be removed (S104). The processes of coating a photoresist 14*a* and removing portions of the photoresist 14*a* for selective etching are well known to those skilled in the art, and thus will not be presented in further detail.

Figure 8:
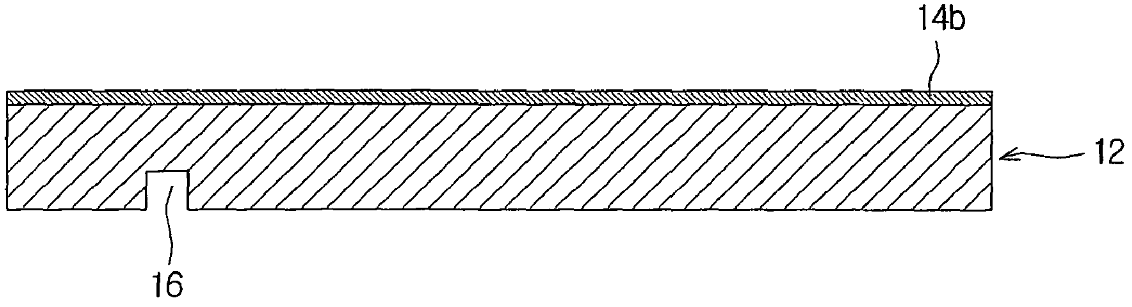

Next, the other side of the plate substrate 12 may be etched to form a straight portion 18 connecting with the nozzle 16 (S200). In the case of using a silicon substrate for the plate substrate 12, the method of forming the straight portion 18 in the other side of the plate substrate 12 may include, as illustrated in FIG. 8, coating a photoresist 14*b* on the other side of the silicon substrate (S201). The photoresist 14*b* may be a photosensitive material, and may be coated on one side of the plate substrate 12 in the form of a film or a liquid.

Figure 9:
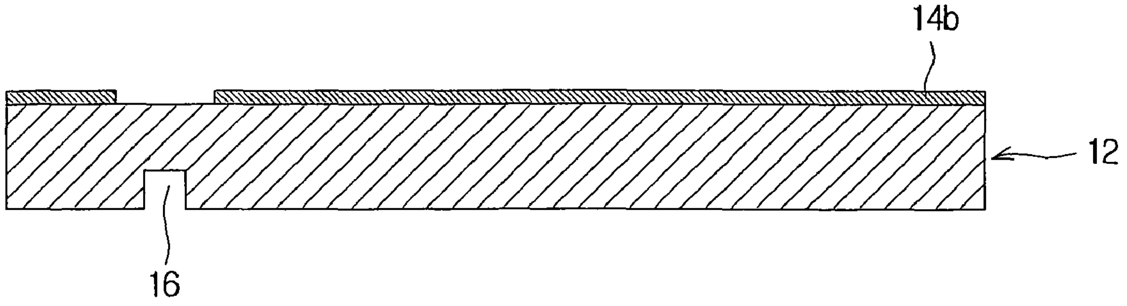

Next, as illustrated in FIG. 9, the photoresist 14*b* may be selectively removed in correspondence to a position where the straight portion 18 is to be formed (S202). As the silicon substrate will be etched to form the straight portion 18, the photoresist 14*b* can be exposed and developed such that an aperture exists at the position where the straight portion 18 is to be formed, after which the photoresist 14*b* can be selectively removed in correspondence to the position where the straight portion 18 will be formed.

Figure 10:
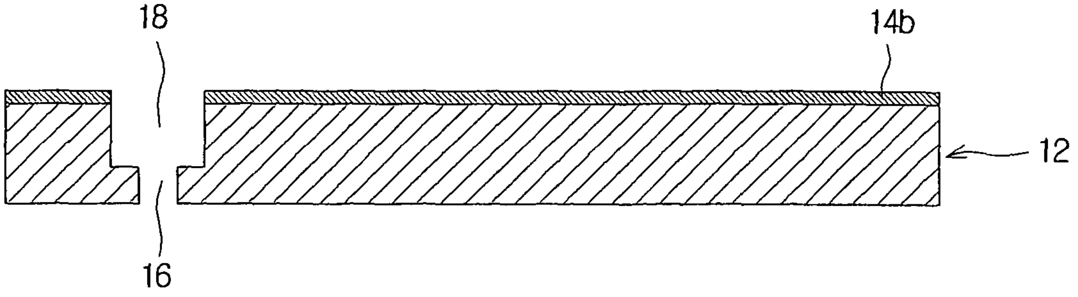

Next, as illustrated in FIG. 10, the silicon substrate may be etched in correspondence to the position where the straight portion 18 will be formed (S203). A type of wet etching may be employed, in which an etching liquid capable of etching the silicon liquid is applied, or a type of dry etching may be employed, in which the substrate is etched in one direction to a particular depth. In this embodiment, as the straight portion 18 has a straight shape, a straight etching process is employed to form the straight portion 18. An example of a typical straight etching process is ICP-RIE (inductively coupled plasma reactive ion etching), but the invention is not thus limited.

The straight portion 18 formed by etching in the other side of the silicon substrate connects with the nozzle 16 formed in one side of the silicon substrate to form a passage through which ink may move. When a change in volume of the pressure chamber 28 causes ink to be ejected through the nozzle 16, the straight portion 18 may serve as a damper to stabilize the flow of the ink being rapidly ejected from the pressure chamber 28.

Next, the photoresist 14*b* remaining on the silicon substrate may be removed (S204). The processes of coating a photoresist 14*b* and removing portions of the photoresist 14*b* for selective etching are well known to those skilled in the art, and thus will not be presented in further detail.

Figure 11:
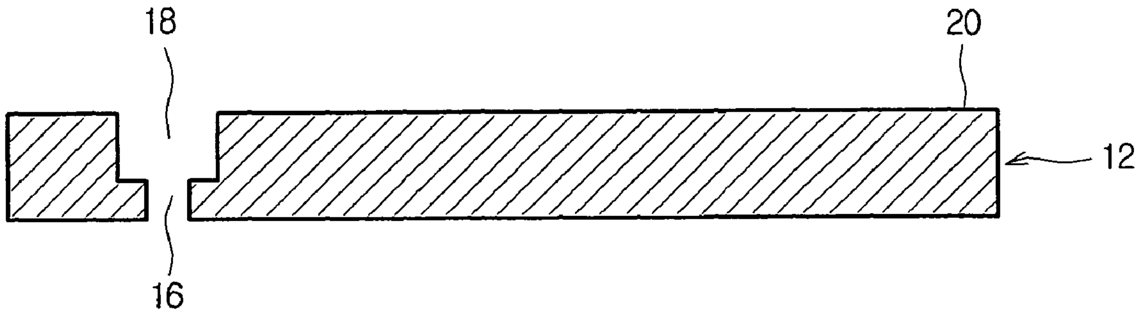

Next, as illustrated in FIG. 11, a hydrophilic layer 20 may be formed on one or more surfaces of the plate substrate 12 (S300). In the case of a silicon substrate, the hydrophilic layer 20 can be formed by growing an oxide film (SiO2) on the surfaces of the silicon substrate by thermal oxidation, etc.

Figure 12:
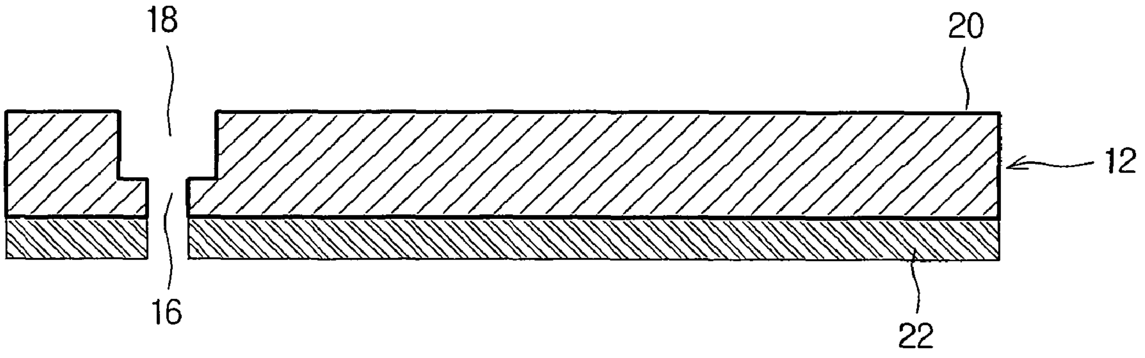

Next, a hydrophobic layer 22 having a window 36 prepared which opens the nozzle 16 by a circumference greater than the circumference of the nozzle 16 may be formed on one side of the plate substrate 12 (S400). A method of forming the hydrophobic layer 22 having a window 36 opened includes, as illustrated in FIG. 12, plating a hydrophobic material onto the side of the silicon substrate in which the nozzle 16 is formed, to form a plating layer 21 (S401). In this case, the plating layer 21 can be formed to a substantial thickness, such that the window 36 that will be processed later forms a difference in level with respect to the end portion of the nozzle 16.

In this particular embodiment, the plating layer 21 may be formed using polytetrafluroethylene (PTFE) by a method of PTFE composite plating, in a plating bath with an electric field applied under certain conditions. However, it is possible to form the plating layer 21 by vacuum-depositing a fluorine-based or a Teflon-based material.

Figure 13:
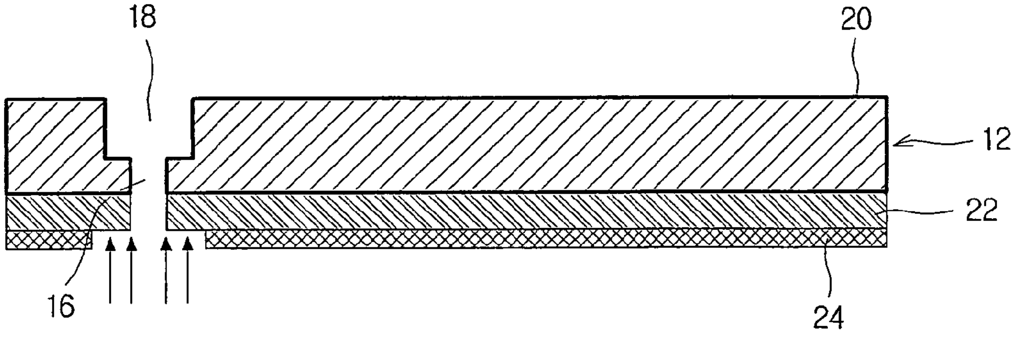

Next, as illustrated in FIG. 13, a mask 24 having an aperture in correspondence with the position where the window 36 will be formed may be stacked on one side of the plate substrate 12 (S402), after which plasma treatment may be performed on the plating layer 21 in correspondence to the position where the window 36 is to be formed, to etch the plating layer 21 and form the window 36 (S403). The plasma treatment may not be applied to portions of the plating layer 21 covered by the mask 24, whereas portions of the plating layer 21 exposed by the aperture of the mask 24 may be removed, so that a hydrophobic layer 22 may be formed in which a window 36 is prepared that opens the nozzle 16. When the window 36 is formed, the mask 24 stacked on the plating layer 21 may be removed (S404).

The aperture formed in the mask 24 can be made to have a circumference greater than the circumference of the end portion of the nozzle 16, and the window 36 can be formed in the plating layer 21 by plasma treatment, which allows etching in a straight direction.

When an electrical energy is applied inside a vacuum chamber while adding gases such as argon (Ar), hydrogen (H2), and oxygen (O2), etc., singularly or as a mixture, the gases added are activated to a plasma phase by the collisions between accelerated electrons. The plasma treatment may involve colliding the ions or radicals, etc., of the gases created in such a plasma phase onto the surface of the plate substrate 12 having the mask 24 stacked thereon.

Figure 14:
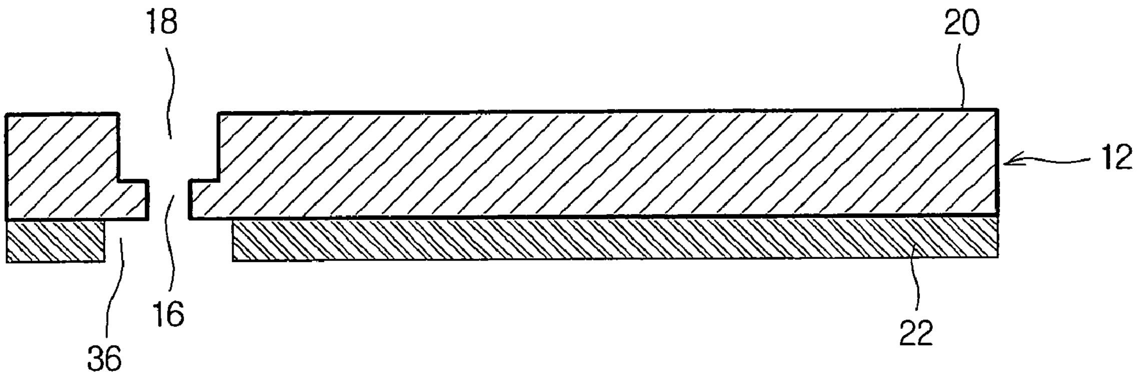

By way of the above procedures, the window 36 may be given a circumference greater than that of the end portion of the nozzle 16, as illustrated in FIG. 14, and thus the hydrophobic layer 22 may be formed that has a window 36 opening the end portion of the nozzle 16 to the exterior. At the bottom side of the window 36, the hydrophilic layer 20 formed in a previous process may be exposed.

The plating layer 21 can be made substantially thick, and the window 36 can be opened, such that a level difference is formed between the end portion of the nozzle 16 and the surface formed by the hydrophobic layer 22. By thus forming a difference in level between the end of the nozzle 16 and the surface of the hydrophobic layer 22, the hydrophobic layer 22 may prevent the wipers from directly touching the end portion of the nozzle 16, when wipers are used to clean the nozzles 16 during maintenance of the inkjet head, to prevent the ends of the nozzles 16 from being damaged by the wipers.

Figure 15:
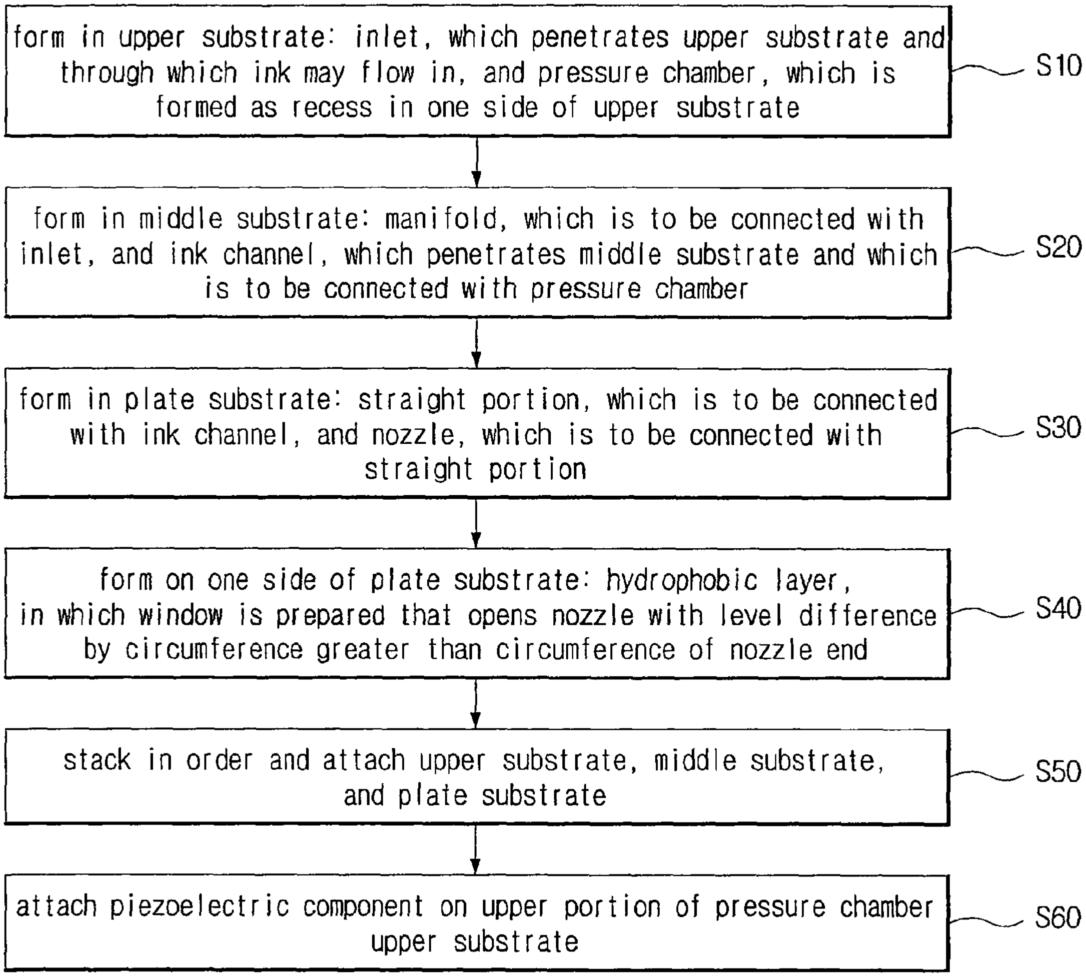
FIG. 15 is a flowchart of a method of manufacturing an inkjet head according to a second disclosed embodiment of the present invention.
Figure 16:
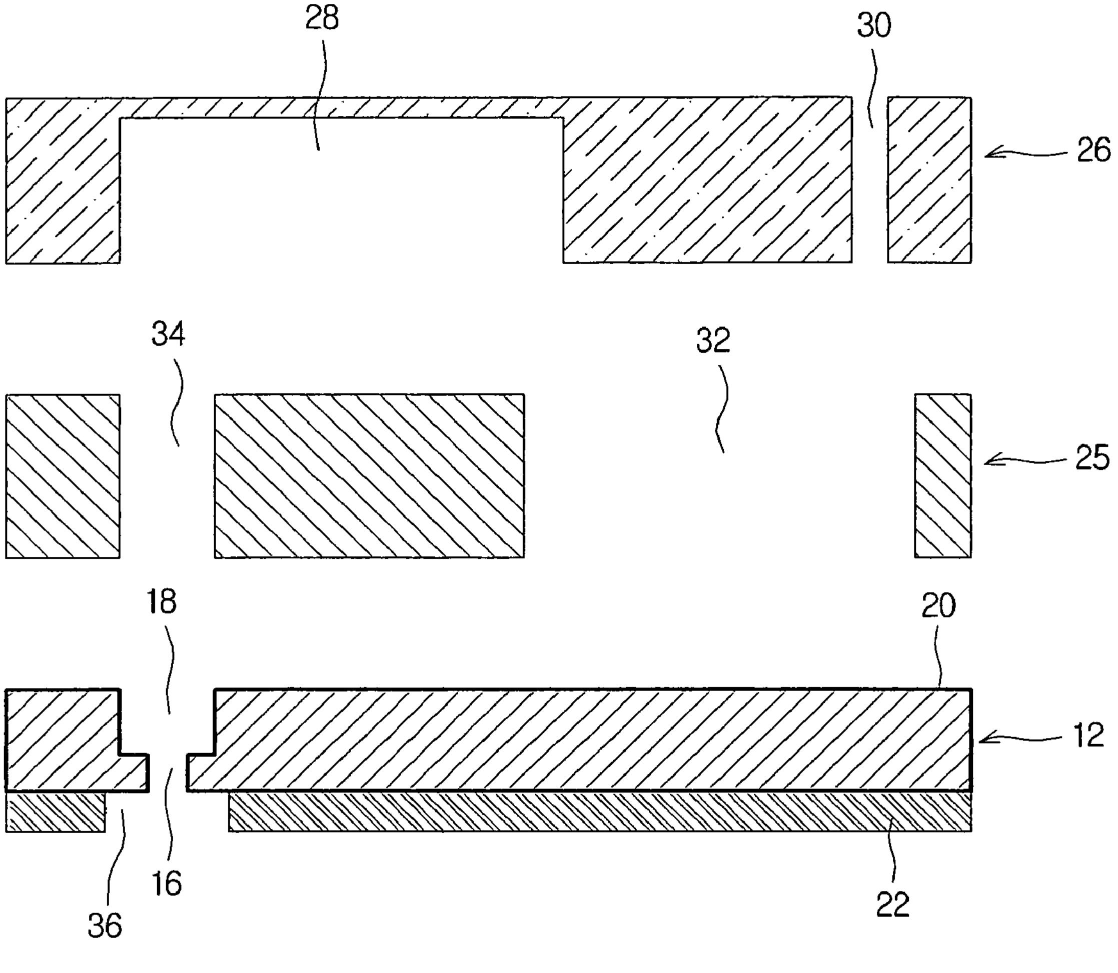
FIG. 16, FIG. 17, and FIG. 18 are cross-sectional views representing a flow diagram for a method of manufacturing an inkjet head according to the second disclosed embodiment of the present invention.
Figure 17:
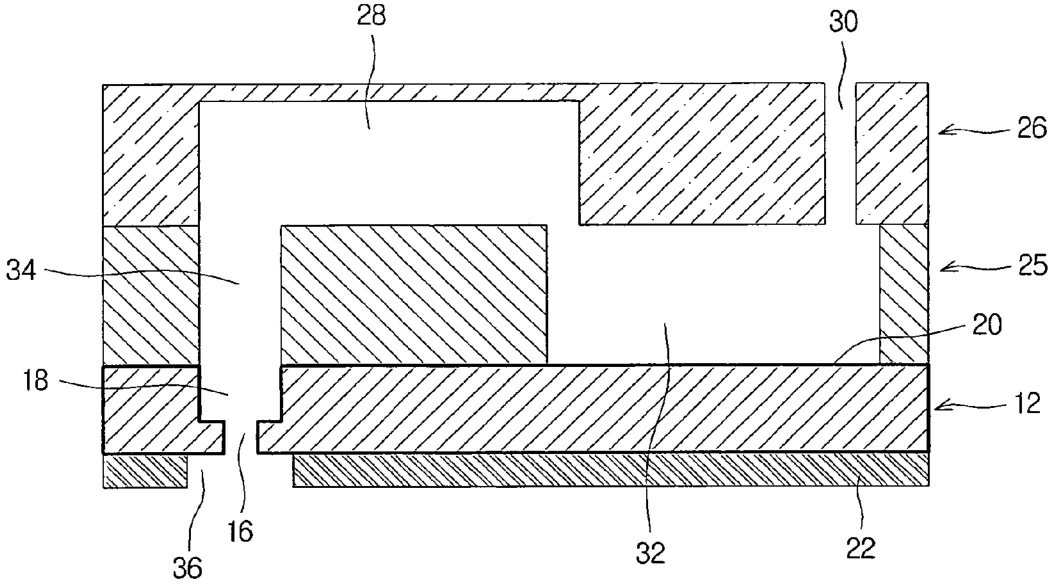
Figure 18:
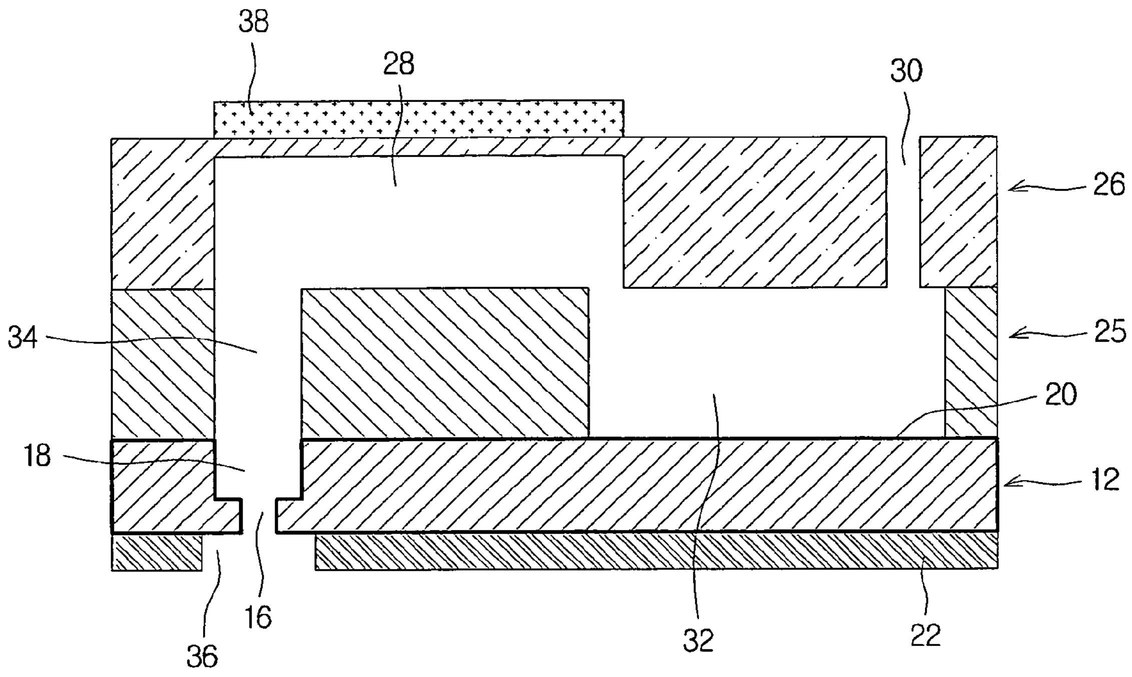

FIG. 15 is a flowchart of a method of manufacturing an inkjet head according to a second disclosed embodiment of the present invention, and FIG. 16 to FIG. 18 are cross-sectional views representing a flow diagram for a method of manufacturing an inkjet head according to the second disclosed embodiment of the present invention. In FIGS. 16 to 18 are illustrated a plate substrate 12, a nozzle 16, a straight portion 18, a hydrophilic layer 20, a hydrophobic layer 22, a mask 24, an upper substrate 26, a middle substrate 25, a pressure chamber 28, an inlet 30, a manifold 32, an ink channel 34, a window 36, and a piezoelectric component 38.

A method of manufacturing an inkjet head according to this embodiment can include forming in an upper substrate 26 an inlet 30, which penetrates the upper substrate 26 and provides a passage for an inflow of ink, and a pressure chamber 28, which is formed as a recess in one side of the upper substrate 26; forming in a middle substrate 25 a manifold 32, which is to be connected with the inlet 30, and an ink channel 34, which penetrates the middle substrate 25 and which is to be connected with the pressure chamber 28; forming in a plate substrate 12 a straight portion 18, which is to be connected with the ink channel 34, and a nozzle 16, which is connected with the straight portion 18; forming on one side of the plate substrate 12 a hydrophobic layer 22, in which a window 36 is formed that opens the nozzle 16 by a circumference greater than a circumference of an end of the nozzle 16; and stacking the upper substrate 26, middle substrate 25, and plate substrate 12 in order and attaching them together. As the meniscus of ink can be formed to a greater size around the nozzle 16 exit, degradations in ink ejection performance caused by the vaporization of the ink solvent can be prevented, as well as blockage of the nozzle 16 caused by the clogging of ink particles. Also, because the ink may be ejected in a stable manner regardless of the ink solvent, and as blockage may be prevented in the nozzles 16, the life span of the inkjet head can be increased. Moreover, during maintenance of the inkjet head, the wipers may be prevented from touching the ends of the nozzles 16, so that the nozzle 16 ends are prevented from damage, whereby the life span of the inkjet head can be increased.

In this embodiment, the inkjet head may be manufactured by stacking three substrates in order and attaching them together. First, as illustrated in the upper portion of FIG. 16, an inlet 30, which penetrates through the upper substrate 26 and through which ink can flow in, as well as a pressure chamber 28, recessed in one side of the upper substrate 2, may be formed in the upper substrate 26 (S10).

The inlet 30 may be a passage that is connected to the reservoir (not shown), which supplies ink to the inkjet head. The pressure chamber 28 has the form of a recess in one surface of the upper substrate 26, but when the upper substrate 26 and middle substrate 25 are attached together, the middle substrate 25 may cover a portion of the pressure chamber 28, so that the pressure chamber 28 may form a particular space. The upper portion of the pressure chamber 28 may have the form of a thin layer, such that the volume inside the pressure chamber 28 can be changed by a piezoelectric component 38 attached in a subsequent process.

One method of forming the pressure chamber 28 and the inlet 30 may include coating a photoresist on one surface of the upper substrate 26 and afterwards removing the photoresist in correspondence to the positions where the pressure chamber 28 and the inlet 30 are to be formed. Then, in the position where the inlet 30 is to be formed, the upper substrate 26 may be etched such that the upper substrate 26 is penetrated, while in the position where the pressure chamber 28 is to be formed, a portion of the upper substrate 26 may be etched, after which the photoresist remaining on the upper substrate 26 can be removed.

The upper substrate 26 may be made from a silicon substrate, and a straight etching process may be employed to etch the substrate to particular depths and form the inlet 30 and the pressure chamber 28. An example of a typical straight etching process is ICP-RIE (inductively coupled plasma reactive ion etching), but the invention is not thus limited.

Next, as illustrated in the middle portion of FIG. 16, a manifold 32, which is to be connected with the inlet 30, and an ink channel 34, which is to be connected with the pressure chamber 28 and which penetrates the middle substrate 25, may be formed in the middle substrate 25 (S20).

The manifold 32 may be connected with the inlet 30 to supply ink from the reservoir (not shown) to the pressure chamber 28. The ink channel 34 may be connected with the straight portion 18 formed in the plate substrate 12, and together with the straight portion 18 may serve as dampers for stabilizing the flow of the ink rapidly ejected from the pressure chamber 28 when a change in volume of the pressure chamber 28 causes the ink to be ejected through the nozzle 16.

A method of forming the manifold 32 and the ink channel 34 may include coating one side of the middle substrate 25 with a photoresist and then selectively removing the photoresist in correspondence to the positions where the manifold 32 and ink channel 34 are to be formed. Then, the manifold 32 and the ink channel 34 may be formed by etching the middle substrate 25 such that the middle substrate 25 is penetrated, after which the photoresist remaining on the middle substrate 25 may be removed.

The middle substrate 25 may be made from a silicon substrate, and a straight etching process may be employed to etch the substrate until it is penetrated and form the manifold 32 and the ink channel 34. An example of a typical straight etching process is ICP-RIE (inductively coupled plasma reactive ion etching), but the invention is not thus limited.

Next, as illustrated in the lower portion of FIG. 16, a straight portion 18, which is to be connected with the ink channel 34, and a nozzle 16, which connects with the straight portion 18, may be formed in the plate substrate 12 (S30), and a hydrophobic layer 22, in which a window 36 is formed that opens the nozzle 16 by a circumference greater than the circumference of the end portion of the nozzle 16, may be formed on one side of the plate substrate 12 (S40). Before forming the hydrophobic layer 22 on the plate substrate 12, an operation may be included of forming a hydrophilic layer 20 on at least one surface of the plate substrate 12. If the plate substrate 12 is a silicon substrate, the hydrophilic layer 20 may be formed by growing an oxide film.

The methods of forming in or on the plate substrate 12 the straight portion 18, the nozzle 16, and the hydrophobic layer 22 having a window 36 prepared therein are substantially the same as the methods described with reference to the first disclosed embodiment, and thus the descriptions thereof will not be repeated.

Next, as illustrated in FIGS. 16 and 17, the upper substrate 26, middle substrate 25, and plate substrate 12 may be stacked in order and attached together (S50). The upper substrate 26 and middle substrate 25 may be stacked together such that the inlet 34 of the upper substrate 26 and the manifold 32 of the middle substrate 25 are connected, one end of the pressure chamber 28 of the upper substrate 26 and the manifold 32 of the middle substrate 25 are connected, and the other end of the pressure chamber 28 of the upper substrate 26 and the ink channel 22 of the middle substrate 25 are connected. The middle substrate 25 and the plate substrate 12 may be stacked together such that the ink channel 34 of the middle substrate 25 and the straight portion 18 of the plate substrate 12 are connected.

If the upper substrate 26, middle substrate 25, and plate substrate 12 are formed by processing silicon substrates, each of the substrates can be attached by silicon direct bonding, which is a technique of pressing under a high temperature, without having to use a separate bonding agent for the attachment.

Next, as illustrated in FIG. 18, a piezoelectric component 38 may be attached to an upper portion of the pressure chamber 28 of the upper substrate 26 (S60). As described above, after fabricating each of the upper substrate 26, middle substrate 25, and plate substrate 12, and then stacking these in order and attaching them together, a piezoelectric component 38 can be attached to an upper surface of the pressure chamber 28 of the upper substrate 26, to manufacture a piezoelectric type inkjet head.

Figure 19:
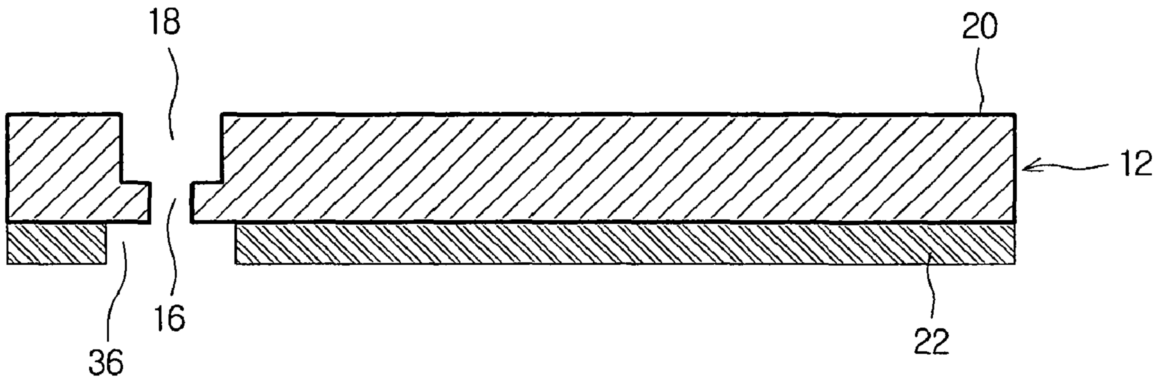
FIG. 19 is a cross-sectional view of a nozzle plate according to a third disclosed embodiment of the present invention.
Figure 22:
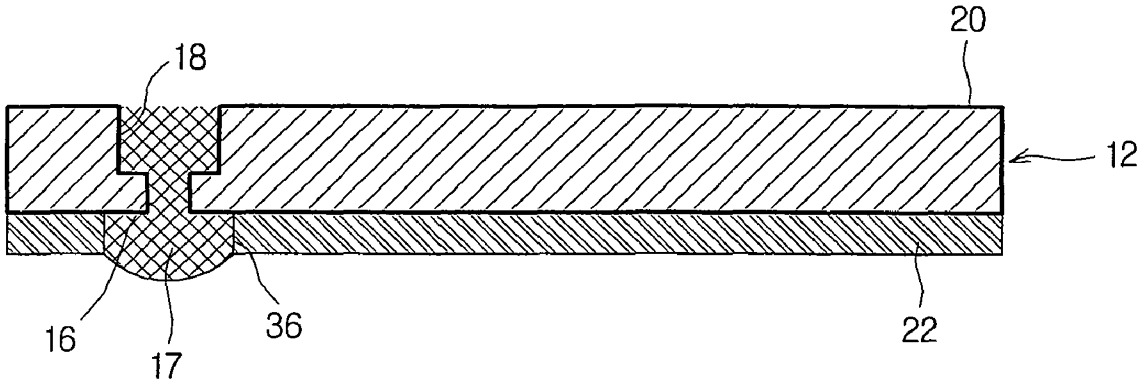
FIG. 22 is a diagram illustrating the meniscus of ink ejected from a nozzle plate according to the third disclosed embodiment of the present invention.

FIG. 19 is a cross-sectional view of a nozzle plate according to a third disclosed embodiment of the present invention, and FIG. 22 is a diagram illustrating the meniscus of ink ejected from a nozzle plate according to the third disclosed embodiment of the present invention. In FIGS. 19 and 22 are illustrated a plate substrate 12, a nozzle 16, a straight portion 18, a hydrophilic layer 20, a window 36, and a meniscus 40.

This embodiment relates to a nozzle plate configured to eject droplets of ink. The nozzle plate may include a plate substrate 12; a nozzle 16 formed as a recess in one side of the plate substrate; a straight portion, which is formed as a recess in the other side of the plate substrate and connected with the nozzle; and a hydrophobic layer, which is formed on the one side of the plate substrate and in which a window is formed that opens the nozzle by a circumference greater than a circumference of an end of the nozzle. In such a nozzle plate, the meniscus 40 of ink can be made to a greater size around the nozzle 16 exit, which can prevent degradations in ink ejection performance caused by the vaporization of the ink solvent, as well as blockage of the nozzle 16 caused by the clogging of ink particles. Also, because the ink may be ejected in a stable manner regardless of the ink solvent, and as blockage may be prevented in the nozzles 16, the life span of the inkjet head can be increased. Moreover, during maintenance of the inkjet head, the wipers may be prevented from touching the ends of the nozzles 16, so that the nozzle 16 ends are prevented from damage, whereby the life span of the inkjet head can be increased.

The nozzle 16 is where the ink is ejected, and in many cases, the ink has to be ejected in a stable manner in the form of a complete droplet, if a high printing quality is to be obtained. In order that the ink may be ejected from the nozzle 16 in the form of a complete droplet, a hydrophobic layer may be formed at the end portion of the nozzle 16.

In this embodiment, as illustrated in FIG. 22, a window 36 may be formed in the hydrophobic layer 22 that has a circumference greater than the circumference of the end of the nozzle 16 formed in one side of the plate substrate 12. Thus, a large amount of ink may gather at the nozzle 16 when the meniscus 40 of ink is formed on the nozzle 16, whereby degradations in ink ejection performance caused by the vaporization of the ink solvent can be prevented, as well as blockage of the nozzle 16 caused by the clogging of ink particles.

The ink ejected through a nozzle plate based on this embodiment may be volatile ink. Volatile ink refers to ink that uses a volatile solvent for the solvent of the ink. A volatile solvent is used in a variety of situations as the solvent of the ink, especially when the ink is a functional ink containing nanoparticles. In such situations, the volatile solvent may vaporize much more quickly compared to the case of regular ink, which may leave ink residue inside the nozzle 16 and cause problems in ink ejection. Such problems can be resolved using a nozzle plate according to this embodiment.

The plating layer 21 for forming the hydrophobic layer 22 can be made substantially thick, and the window 36 can be opened, such that a level difference is formed between the end of the nozzle 16 and the surface formed by the hydrophobic layer 22. By thus forming a difference in level between the end of the nozzle 16 and the surface of the hydrophobic layer 22, the hydrophobic layer 22 may prevent the wipers from directly touching the end portion of the nozzle 16, when wipers are used to clean the nozzles 16 during maintenance of the inkjet head, to prevent the ends of the nozzles 16 from being damaged by the wipers.

The straight portion 18 may connect the pressure chamber 28 with the nozzle 16, and when ink is ejected through the nozzle 16 by a change in volume of the pressure chamber 28, the straight portion 18 may serve as a damper that stabilizes the flow of the ink being rapidly ejected from the pressure chamber 28.

As illustrated in FIG. 19, a hydrophilic layer 20 can be formed on the surfaces of the plate substrate 12 in which the nozzle 16 and the straight portion 18 are formed, and the hydrophobic layer 22 having the window 36 as described above can be formed over the hydrophilic layer 20. If the plate substrate 12 is a silicon substrate, the hydrophilic layer 20 can be formed by growing an oxide film (SiO2) on the surfaces of the silicon substrate by thermal oxidation, etc.

Figure 20:
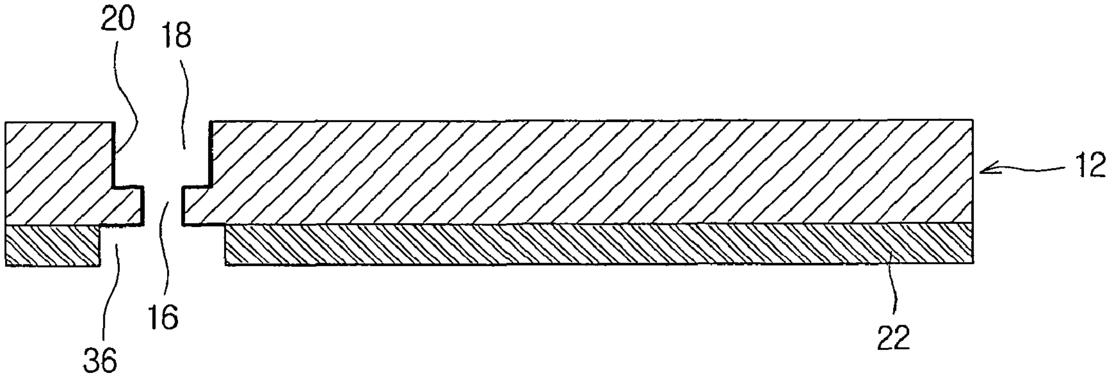
FIG. 20 is a cross-sectional view of a nozzle plate according to a fourth disclosed embodiment of the present invention.

FIG. 20 is a cross-sectional view of a nozzle plate according to a fourth disclosed embodiment of the present invention. In FIG. 20 are illustrated a plate substrate 12, a nozzle 16, a straight portion 18, a hydrophilic layer 20, a hydrophobic layer 22, and a window 36.

Unlike the third disclosed embodiment described above, this particular embodiment illustrates the case where the hydrophobic layer 22 is formed on one side of the plate substrate 12, and the hydrophilic layer 20 is formed only on the inner perimeter of the nozzle 16, the inner perimeter of the straight portion 18, and the bottom side of the window 36. However, as with the previous embodiment, the thickness of the hydrophobic layer 22 can be made greater than the thickness of the hydrophilic layer 20, so that a difference in level may be formed between the end of the nozzle 16 (i.e. the bottom side of the window 36) and the surface of the hydrophobic layer 22. Thus, the hydrophobic layer 22 may prevent the wipers from directly touching the end portion of the nozzle 16, when wipers are used to clean the nozzles 16 during maintenance of the inkjet head, to prevent the ends of the nozzles 16 from being damaged by the wipers.

Figure 21:
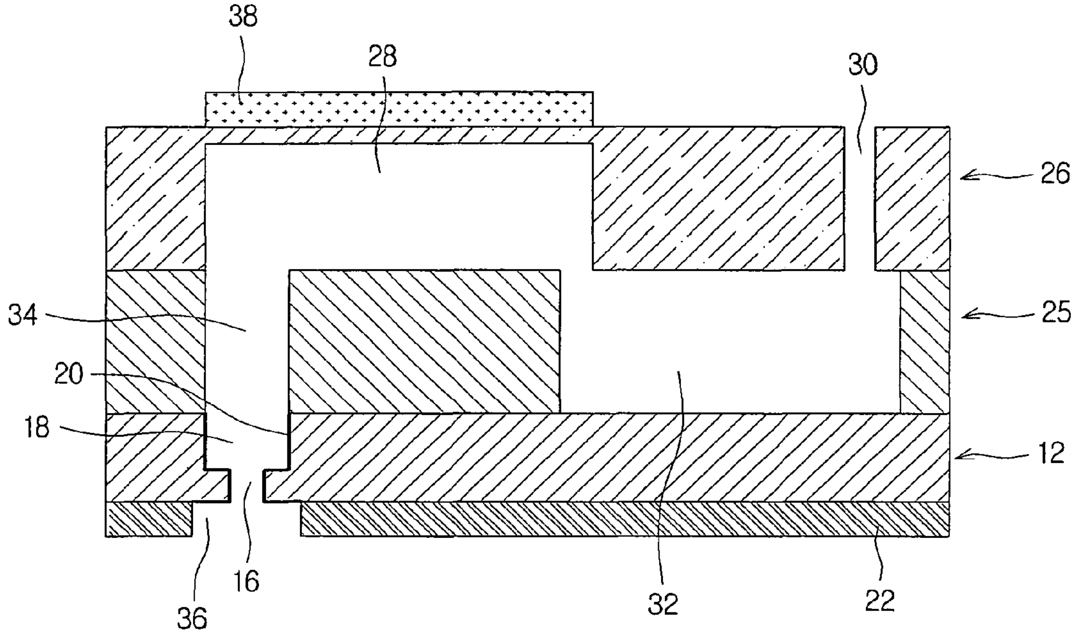
FIG. 21 is a cross-sectional view of an inkjet head according to a fifth disclosed embodiment of the present invention.

FIG. 21 is a cross-sectional view of an inkjet head according to a fifth disclosed embodiment of the present invention. In FIG. 21 are illustrated a plate substrate 12, a nozzle 16, a straight portion 18, a hydrophilic layer 20, a hydrophobic layer 22, an upper substrate 26, a middle substrate 25, a pressure chamber 28, an inlet 30, a manifold 32, an ink channel 34, a window 36, and a piezoelectric component 38.

This embodiment illustrates an inkjet head for ejecting droplets of ink, which may be formed by stacking an upper substrate 26, a middle substrate 25, and a plate substrate 12 in order and attaching these together. The inkjet head may mainly include an inlet 30, which penetrates the upper substrate 26, and through which ink may flow in; a pressure chamber 28 formed as a recess in the side of the upper substrate 26 facing the middle substrate 25; a manifold 32, which penetrates the middle substrate 25, and which is connected with the inlet 30; an ink channel 34, which penetrates the middle substrate 25, and which is connected with the pressure chamber 28; a straight portion 18, which is formed as a recess in the side of the plate substrate 12 facing the middle substrate 25, and which is connected with the ink channel 34; a nozzle 16 that penetrates the plate substrate 12, from the bottom side of the straight portion 18 to the other side of the plate substrate 12; and a hydrophobic layer 22, which is formed on the other side of the plate substrate 12, and in which a window 36 is prepared that opens the nozzle 16 by a circumference greater than a circumference of the nozzle 16. In this inkjet head, the meniscus of ink can be made to a greater size around the nozzle 16 exit, which in turn can prevent degradations in ink ejection performance caused by the vaporization of the ink solvent, as well as blockage of the nozzle 16 caused by the clogging of ink particles. Also, because the ink may be ejected in a stable manner regardless of the ink solvent, and as blockage may be prevented in the nozzles 16, the life span of the inkjet head can be increased. Moreover, during maintenance of the inkjet head, the wipers may be prevented from touching the ends of the nozzles 16, so that the nozzle 16 ends are prevented from damage, whereby the life span of the inkjet head can be increased.

The inkjet head may additionally include a piezoelectric component 38, which may be coupled to one side of the pressure chamber 28 to change the volume of the pressure chamber 28.

The upper substrate 26, middle substrate 25, and plate substrate 12 can be stacked in order and attached together, where the upper substrate 26 and middle substrate 25 may be stacked together such that the inlet 34 of the upper substrate 26 and the manifold 32 of the middle substrate 25 are connected, one end of the pressure chamber 28 of the upper substrate 26 and the manifold 32 of the middle substrate 25 are connected, and the other end of the pressure chamber 28 of the upper substrate 26 and the ink channel 22 of the middle substrate 25 are connected. Furthermore, the middle substrate 25 and the plate substrate 12 may be stacked together such that the ink channel 34 of the middle substrate 25 and the straight portion 18 of the plate substrate 12 are connected.

If the upper substrate 26, middle substrate 25, and plate substrate 12 are formed by processing silicon substrates, each of the substrates can be attached by silicon direct bonding, which is a technique of pressing under a high temperature, without having to use a separate bonding agent for the attachment.

This particular embodiment presents the case where the hydrophobic layer 22 is formed on one side of the plate substrate 12, and the hydrophilic layer 20 is formed only on the inner perimeter of the nozzle 16, the inner perimeter of the straight portion 18, and the bottom side of the window 36. Of course, as already described above, it is possible to form the hydrophilic layer 20 on the surfaces of the plate substrate 12 in which the nozzle 16 and the straight portion 18 are formed, and then form the hydrophobic layer 22 having the window 36 as described above over the hydrophilic layer 20.

Other elements of this embodiment are substantially the same as the corresponding elements of the previously disclosed embodiments, and thus the descriptions thereof will not be repeated.

Certain aspects of the invention as set forth above enable the meniscus of ink to be made to a greater size around the nozzle exit, thereby preventing degradations in ink ejection performance caused by the vaporization of the ink solvent, as well as preventing blockage of the nozzle caused by the clogging of ink particles.

Also, because the ink may be ejected in a stable manner regardless of the ink solvent, and as blockage may be prevented in the nozzles, the life span of the inkjet head can be increased.

Furthermore, during maintenance of the inkjet head, the wipers may be prevented from touching the ends of the nozzles, so that the nozzle ends are prevented from damage, whereby the life span of the inkjet head can be increased.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:

1. A method of manufacturing a nozzle plate, the method comprising:

forming a nozzle by selectively etching one side of a plate substrate;

forming a straight portion connecting with the nozzle by selectively etching the other side of the plate substrate; and forming a hydrophobic layer on the one side of the plate substrate, wherein the hydrophobic layer has a window formed therein, the window opening the nozzle by a circumference greater than a circumference of an end of the nozzle.

2. The method of claim 1, further comprising, before forming the hydrophobic layer:

forming a hydrophilic layer on at least one surface of the plate substrate.

3. The method of claim 2, wherein the plate substrate is a silicon (Si) substrate, and the hydrophilic layer is formed by growing an oxide film (SiO2).

4. The method of claim 1, wherein the plate substrate is made of a silicon substrate, and wherein forming the nozzle comprises:

coating a first photoresist on one side of the silicon substrate;

selectively removing the first photoresist in correspondence with a position where the nozzle is to be formed;

etching the silicon substrate in correspondence with a position where the nozzle is to be formed; and removing the first photoresist remaining on the silicon substrate, and forming the straight portion comprises:

coating a second photoresist on the other side of the silicon substrate;

selectively removing the second photoresist in correspondence with a position where the straight portion is to be formed;

etching the silicon substrate in correspondence with a position where the straight portion is to be formed; and removing the second photoresist remaining on the silicon substrate.

5. The method of claim 1, wherein forming the hydrophobic layer comprises:

forming a plating layer by plating a hydrophobic material on one side of the plate substrate;

stacking a mask on the one side of the plate substrate, the mask having an aperture formed therein in correspondence with a position where the window is to be formed;

applying plasma treatment on the plating layer in correspondence with a position where the window is to be formed; and removing the mask.

6. The method of claim 5, wherein the hydrophobic material is polytetrafluroethylene (PTFE).

7. A method of manufacturing an inkjet head, the method comprising:

forming an inlet and a pressure chamber in an upper substrate, the inlet penetrating the upper substrate and providing a passage for an inflow of ink, and the pressure chamber formed as a recess in one side of the upper substrate;

forming a manifold and an ink channel in a middle substrate, the manifold configured to be connected with the inlet, and the ink channel penetrating the middle substrate and configured to be connected with the pressure chamber;

forming a straight portion and a nozzle in a plate substrate, the straight portion configured to be connected with the ink channel, and the nozzle connected with the straight portion;

forming a hydrophobic layer on one side of the plate substrate, the hydrophobic layer having a window formed therein, and the window opening the nozzle by a circumference greater than a circumference of an end of the nozzle; and stacking in order and attaching the upper substrate, the middle substrate, and the plate substrate.

8. The method of claim 7, further comprising, after the attaching:

attaching a piezoelectric component on an upper portion of the pressure chamber of the upper substrate.

9. The method of claim 7, wherein the upper substrate, the middle substrate, and the plate substrate are formed by processing silicon substrates, and the attaching is performed by silicon direct bonding.

10. The method of claim 7, further comprising, before forming the hydrophobic layer:

forming a hydrophilic layer on at least one surface of the plate substrate.

11. The method of claim 10, wherein the plate substrate is a silicon substrate, and the hydrophilic layer is formed by growing an oxide film (SiO2).

12. The method of claim 7, wherein the plate substrate is made of a silicon substrate, and wherein forming the nozzle comprises:

coating a first photoresist on one side of the silicon substrate;

selectively removing the first photoresist in correspondence with a position where the nozzle is to be formed;

etching the silicon substrate in correspondence with a position where the nozzle is to be formed; and removing the first photoresist remaining on the silicon substrate, and forming the straight portion comprises:

coating a second photoresist on the other side of the silicon substrate;

selectively removing the second photoresist in correspondence with a position where the straight portion is to be formed;

etching the silicon substrate in correspondence with a position where the straight portion is to be formed; and removing the second photoresist remaining on the silicon substrate.

13. The method of claim 7, wherein forming the hydrophobic layer comprises:

forming a plating layer by plating a hydrophobic material on one side of the plate substrate;

stacking a mask on the one side of the plate substrate, the mask having an aperture formed therein in correspondence with a position where the window is to be formed;

applying plasma treatment on the plating layer in correspondence with a position where the window is to be formed; and removing the mask.

14. The method of claim 13, wherein the hydrophobic material is polytetrafluroethylene (PTFE).

* * * * *